United States Patent

Burbank, III

[15] 3,706,860

[45] Dec. 19, 1972

[54] MAGNETIC CARD DATA RECORDER/REPRODUCER

[72] Inventor: John Emerson Burbank, III, Ridgefield, Conn.

[73] Assignee: Wiltek, Inc., Wilton, Conn.

[22] Filed: Aug. 20, 1970

[21] Appl. No.: 65,631

[52] U.S. Cl.............179/100.2 CA, 179/100.2 MD, 235/61.11 D, 340/149 A

[51] Int. Cl.........................G11b 15/26, G11b 25/04

[58] Field of Search..........179/100.2 CA, 100.2 MD; 235/61.11 D; 340/149 A, 174.1 F; 346/74 MP; 35/35 C

[56] References Cited

UNITED STATES PATENTS

| | | | |
|---|---|---|---|
| 3,471,654 | 10/1969 | Dollenmayer | 179/100.2 CA |
| 3,434,130 | 3/1969 | Lemelson | 340/174.1 F |
| 3,514,770 | 5/1970 | Parken | 340/174.1 F |
| 3,417,233 | 12/1968 | Stewart | 235/61.11 D |
| 2,685,409 | 8/1964 | English et al. | 235/61.11 D |

*Primary Examiner*—James W. Moffitt
*Assistant Examiner*—Alfred H. Eddleman
*Attorney*—Buckles and Bramblett

[57] ABSTRACT

A compact desk top recorder-reproducer apparatus is disclosed employing a card coated with magnetic oxide as the record medium. In the recording mode the record card is moved in a first linear direction with respect to a stationary magnetic recording head to record a line of incoming signals. Upon completing each line of recording the record card is rapidly moved in the opposite direction to its starting position while the recording head is stepped a discrete distance normal to direction of card traverse, and successive parallel tracks of data are recorded. Typically the device requires an electronic input register or character buffer to store one line or block of incoming data at a first reception rate and deliver such data to the recording transducer at a rate compatible with the motions of the recording apparatus. In the read mode the same relative motions are performed, with the magnetic transducer serving to detect and playback the previously recorded data. This data is first stored in the electronic registers and then delivered to other devices at a different speed. Anti-backlash means in combination with a transducer advancing mechanism provides precise positioning of closely spaced record tracks, while automatic card centering means and rapid reverse drive means assure maximum density data packing and high speed recording and read-out operation. In the preferred embodiment a dual track transducer head provides for either clock pulses on tracks parallel to data pulses or self synchronizing methods such as NRZI encoded data on one track and NRZI encoded complement on the second track. By employing alternative electrical circuitry the apparatus may record and play back continuous analog signals, such as speech or other sound.

5 Claims, 12 Drawing Figures

INVENTOR.
John Emerson Burbank, III
BY
Buckles and Bramblett
ATTORNEYS

MAGNETIC CARD DATA RECORDER/REPRODUCER

BACKGROUND OF THE INVENTION AND PRIOR ART

With the increasing use of digital computers, and with improved quality of telephone transmission lines enabling the transmittal of digital data between remote offices over existing voice circuits, the need for compact and economical digital recording and read-out apparatus has rapidly developed. Heretofore machines capable of performing such functions were mostly large, cumbersome and costly. One of the prior art solutions to this problem was the development of desk top continuous loop, incrementally advancing, tape recorder/reproducers of the type disclosed by William Reid Smith-Vaniz in U.S. Pat. Nos. 3,357,002, 3,386,018, 3,405,402, and John R. Montgomery U.S. Pat. No. 3,370,283, and pending patent application Ser. No. 775,295 filed Nov. 13, 1968 by John A. Molnar for "Tape Handling and Storage Apparatus," now U.S. Pat. No. 3,552,618 issued Jan. 5, 1971 all assigned to the assignee of the present application. While these prior art devices, marketed under the registered trademark DIGISTORE, have served admirably in the evolutionary development of smaller machines for data recording and reproduction, the need has continued to grow for even more compact and more economical devices of this type. The card machine also has some data handling features not equaled by new "cassette" machines (of various manufacturer).

Among these are the ability for an operator to quickly locate a particular record of information. This is accomplished by physically storing the magnetic card with a printed version of the same data (hard copy) or by affixing an identifying label on the card, etc.

SUMMARY OF THE INVENTION

Accordingly the present invention provides an ultra-compact desk top digital data recorder/reproducer, adapted to sit on one corner of a desk top and occupying little more space than a conventional telephone station handset. This reduction in physical space requirement is achieved by employing a magnetic oxide coated record card of only approximately 3¼ by 7⅜ inches, in a high speed machine providing means for producing rapid translation between a magnetic record/playback transducer head and the small magnetic record card. To produce the desired high speed of operation, means are provided for imparting rapid physical translation of the lightweight record card in a first direction with respect to a temporarily stationary transducer head to record (or playback) a first linear track of digital data, then rapidly indexing the translated card to its starting position while advancing the transducer head a slight distance normal to the direction of card translation, and then recording (or playing back) successive tracks parallel to and closely adjacent each immediately preceding track. In this manner maximum density information packing is achieved on a small flat record card which may be conveniently stored in a card file, or easily mailed in a flat envelope.

Thus, the present invention is directed to improved apparatus for effecting line-by-line scanning of a planar record medium by a transducer, together with intermittent stepping of the transducer at the end of each line scan.

OBJECTS OF THE INVENTION

Accordingly, it is an object of the present invention to provide improved line-by-line transducer scanning means of economical design while assuring positive, accurate, and rapid operation.

Another object of the invention is to provide improved transducer scanning means for recording and reproducing information from a substantially flat planar record medium.

A further object of the invention is to provide manual control for rapid and accurate positioning of transducer scanning means with respect to record media, whereby desired portions of a record may be quickly and accurately selected for reproduction or playback.

A corollary objective is to provide rapid and accurate manual control means for inserting preselected data at desired positions with respect to pre-recorded data on a record medium.

An overall objective of the invention is to provide improved area scanning means which may be employed with either magnetic, photographic or facsimile, media, or for analog data or audio recording and playback, as well as for digital data systems.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

Corresponding reference figures identify corresponding parts in the several views of the drawings.

DETAILED DESCRIPTION OF THE INVENTION

Figure 1:
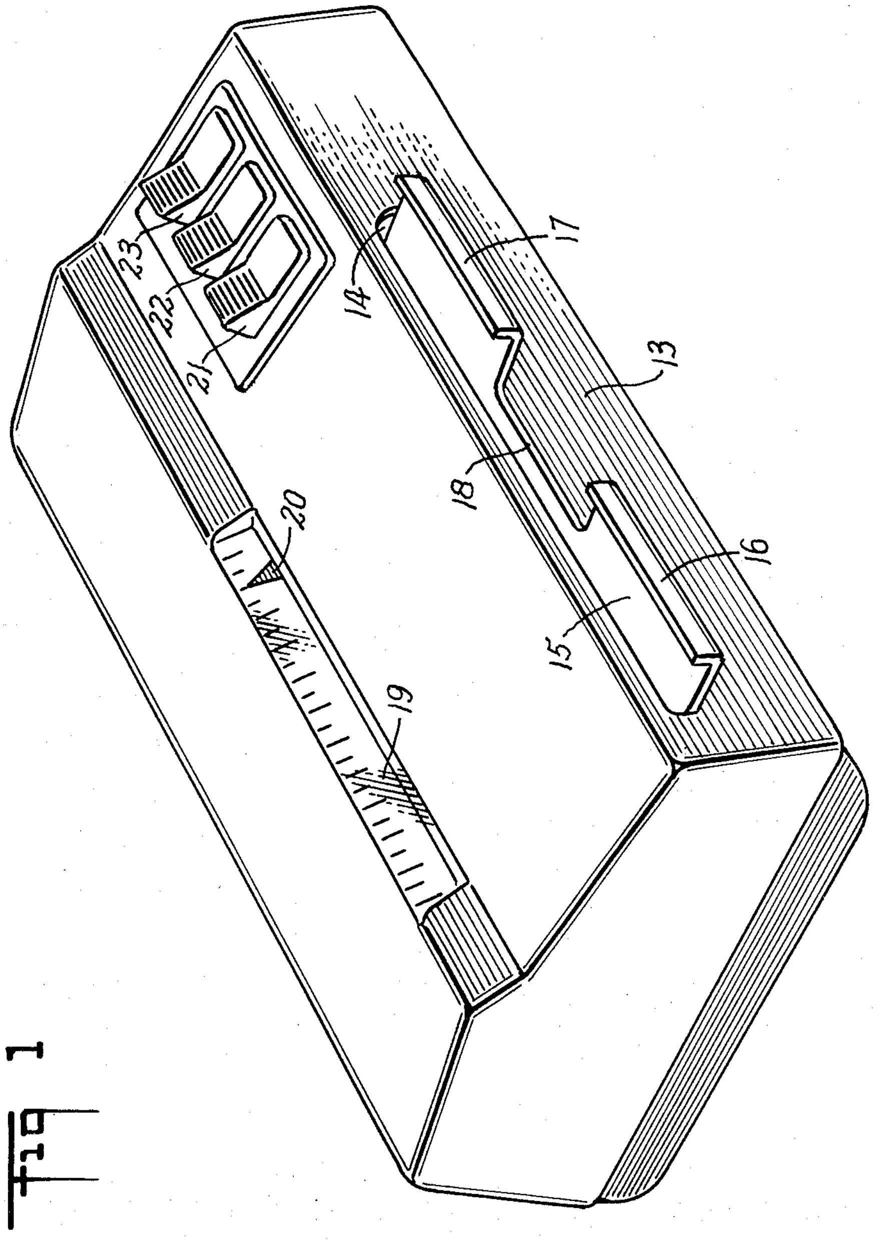
FIG. 1 is an overall exterior perspective view of the assembled apparatus of the invention.

Referring now in greater detail to the disclosure of FIG. 1 of the drawings it will be seen that the card handling apparatus of the invention is enclosed within an aesthetically pleasing outer case having a front wall portion 13 through which is passed a horizontal card entrance slot 14 in which is positioned a card support plate 15 extending partially from slot 14 and having its leading front edges 16 and 17 turned upwardly to provide shallow shoulders which serve as a front edge stop for data cards placed in the machine. A horizontal cut portion 18 facilitates finger gripping of the card by the operator for insertion or removal of a card from the card support plate 15. A transparent horizontal window 19 enables the operator to view a moving index arrow 20 against a stationary graduated scale background whereby the operator may readily determine the location of the internal transducer head with respect to numerous transverse parallel record tracks within the machine. Various manually operable switches 21, 22 and 23, for example, may be provided to control modes of operation of the machine, such as record/playback, external head indexing position control-fore/aft (otherwise indexed automatically) and card eject.

Figure 2:
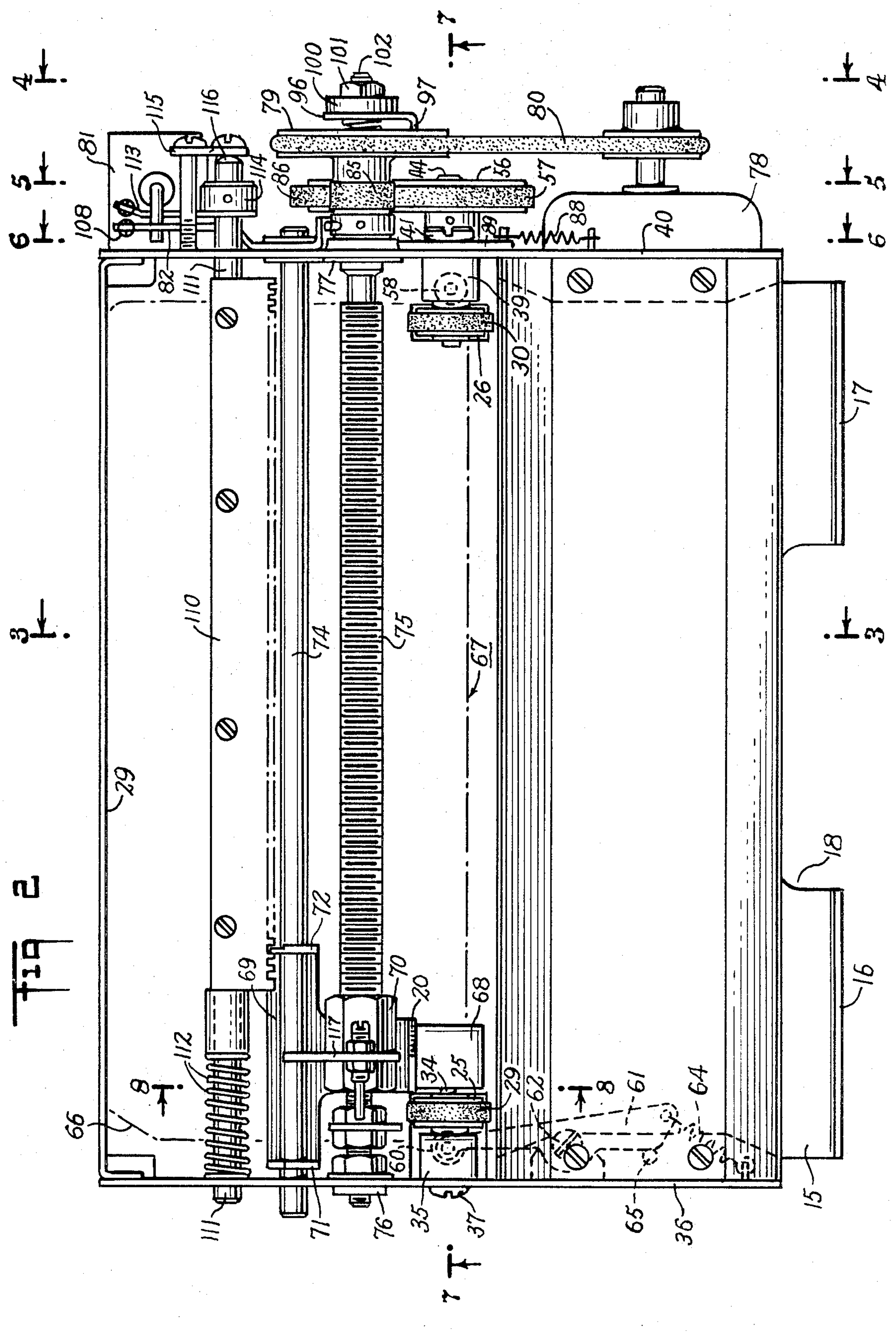
FIG. 2 is a top plan view of the apparatus of FIG. 1, with the top exterior cover removed.
Figure 3:
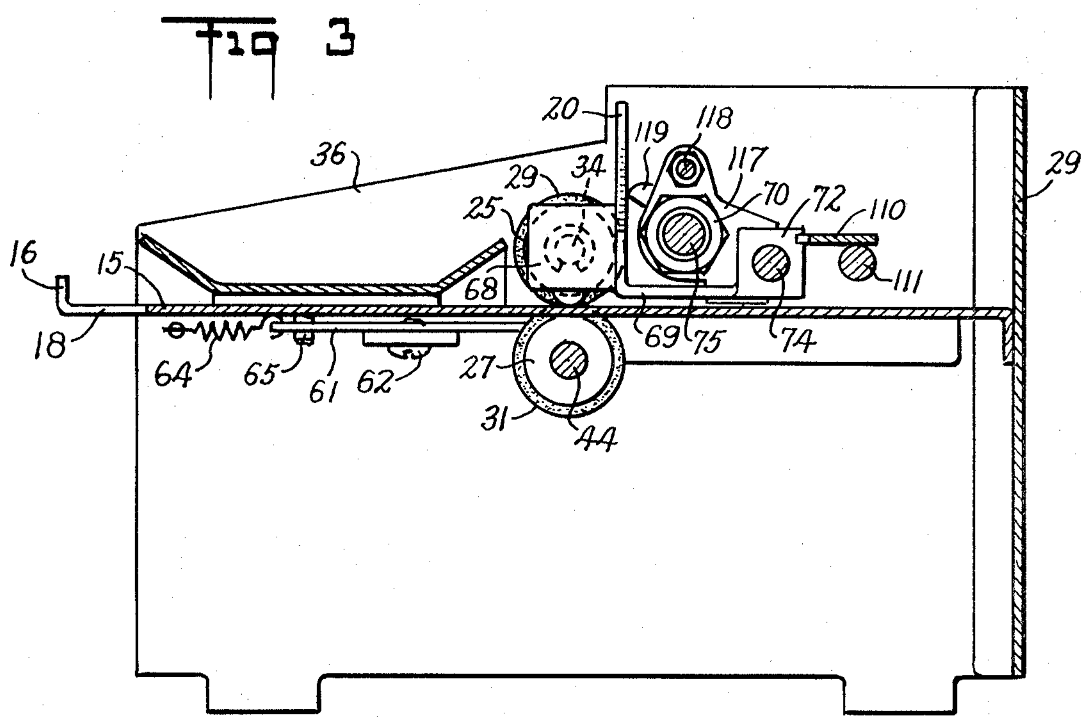
FIG. 3 is a cross-sectional view taken along the line 3—3 of FIG. 2.

Reference is now had to FIG. 2 of the drawings which is a partially cut away top view of the card handling mechanism shown generally in FIG. 1. A record card 67 (shown in outline by broken lines), which may be generally of the standard dimensions 3¼ inches by 7⅜ inches with an indexing corner cut 66, is inserted by the operator into slot 14, the card is retained in a flat horizontal plane by the card support plate 15. A slight inward push by the operator causes the card to engage two sets of friction drive rollers, of which upper idle rollers 25 and 26 are seen in FIG. 2. A pair of drive rollers 27 and 28 (FIG. 7) bear against the bottom surface of the inserted card and rapidly move the card inwardly in a horizontal direction toward the inner rear guide wall 29. Rollers 25 through 28 are rubber rimmed to provide frictional engagement with opposite surfaces of a record card inserted therebetween.

Figure 7:
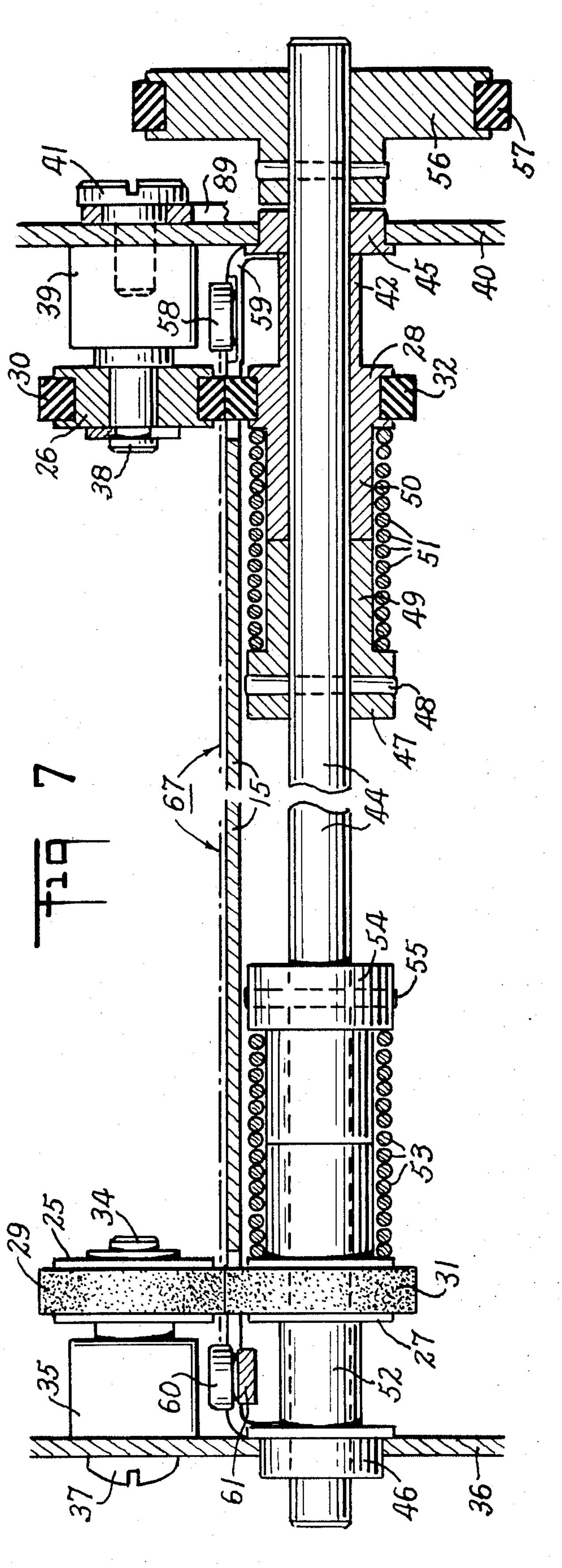
FIG. 7 is an enlarged detail front view, partially in section, taken along the line 7—7 of FIG. 2.

Reference is now had to FIG. 7 of the drawings, which is an enlarged detail view, partially in section, taken along the line 7—7 of FIG. 2. Here it will be seen that idler wheels 25 and 26 are fitted with annular rubber rims 29 and 30, respectively, while drive wheels 27 and 28 are similarly equipped with rubber rims 31 and 32. Left idler wheel 25 runs freely on axle 34 which is rigidly affixed to a mounting block 35 supported on side wall 36 by mounting screw 37. Similarly right idler 26 runs freely on axle 38, affixed to block 39 secured to right wall 40 by mounting screw 41.

Alternatively, the idler wheels 25 and 26 may be mounted to spring loaded arms (rather than rigidly mounted to side walls) such that constant roller force may be applied on the card regardless of card thickness, and at the same time eliminate the need for the rubber rim on the idler rollers.

Still referring to FIG. 7, right drive wheel 28 is formed on and integral with a rotatable sleeve 42 through which passes a drive shaft 44, journaled in bearings 45 and 46 mounted respectively in side walls 40 and 36. Also mounted on drive shaft 44 is an annular driving hub 47 which is secured to shaft 44 by a key or pin 48. A turned down cylindrical portion 49 of hub 47 extends adjacent to and is of the same diameter as a corresponding turned down cylindrical portion 50 of sleeve 42, and these two abutting cylindrical surfaces carry a closely wound helical steel spring 51 which forms a unidirectional slip clutch between driving hub 47 and driven sleeve 42. Left driving wheel 27 is also formed integrally with a corresponding rotatable sleeve 52 which carries a corresponding helical clutch spring 53 in common with a corresponding driving hub 54 similarly secured to drive shaft 44 by a pin 55. Mounted on the right hand end of drive shaft 44 is an external drive wheel 56 which is rimmed with a rubber annulus 57 to impart rotation to shaft 44 in either direction, as will be described more fully hereinafter with reference to FIGS. 5 and 10 of the drawings.

In normal operation, when the machine is started, external drive wheel 56 and drive shaft 44 are constantly rotating in a clockwise direction as viewed from the right side of FIG. 7. As a card is inserted into the apparatus through the entrance slot 14 (FIG. 1) the left edge of the card is engaged between resilient rollers 29–31, the right edge between rollers 30–32, and the card is transported therebetween into engagement with the back stop 29 (FIG. 2) where its rearward motion is arrested and the card assumes its quiescent state. Although drive shaft 44 continues to rotate, drive wheels 27 and 28 now stop turning but have torque applied through the slip clutches formed by helical springs 51 and 53. This continuing torque on the card drive wheels serves to maintain the record card in proper alignment, ready for precision recording or playback upon command. It should be noted that either one of the drive wheels 27 or 28 may continue rotating until its edge of the record card reaches the back stop 29 even though the other drive wheel has been caused to stop. This assures full and complete alignment of the record card long edge against the back stop.

Still referring to FIG. 7, a small low friction ball bearing roller 58 mounted on a rigid bracket 59 affixed to right sidewall 40, and rotatable about a vertical axis, establishes the right end travel limit, or guide, for record cards inserted into the machine. The cards are loaded gently to the right into constant engagement with guide roller 58 by another small ball bearing roller 60 which is movably mounted on the end of a spring loaded lever 61. As shown by broken lines in the plan view of FIG. 2, lever 61 pivots about a vertical axis 62 and is loaded by a light tension spring 64. A fixed pin 65 serves as a stop to limit travel of lever 61 when no card is inserted between end guides 58 and 60. As also shown by broken lines in FIG. 2, the angularly cut upper left hand corner 66 of a card 67 inserted into the machine provides a cam surface which initially engages left guide roller 60 as a card enters the card driving mechanism, causing guide roller 60 to move to the left as arm 61 moves against the tension of spring 64. The angular corner edge 66 of card 67 also serves as a guide to assure that cards can only be inserted into the machine in one position, i.e., with the recording surface 67 on top where it will engage the transducer head.

Still referring to FIG. 2, a transducer head 68, which in the preferred embodiment is a dual head magnetic transducer, is mounted on a T-shaped bracket arm 69 which engages a screw-follower nut 70. The opposite ends of T bracket 69 are bent upwardly to form linear bearing guides 71 and 72 through which pass a stationary horizontal guide bar 74. Nut 70 engages and travels upon a precision threaded helical drive shaft 75 which is journaled at its opposite ends in bearings 76 and 77 mounted, respectively, in sidewalls 36 and 40. Helical drive shaft 75 serves as a lateral lead screw to impart precise incremental translation to transducer head 68 through mechanisms which will be described more fully with reference to FIGS. 5, 6 and 10 hereafter.

Figure 4:
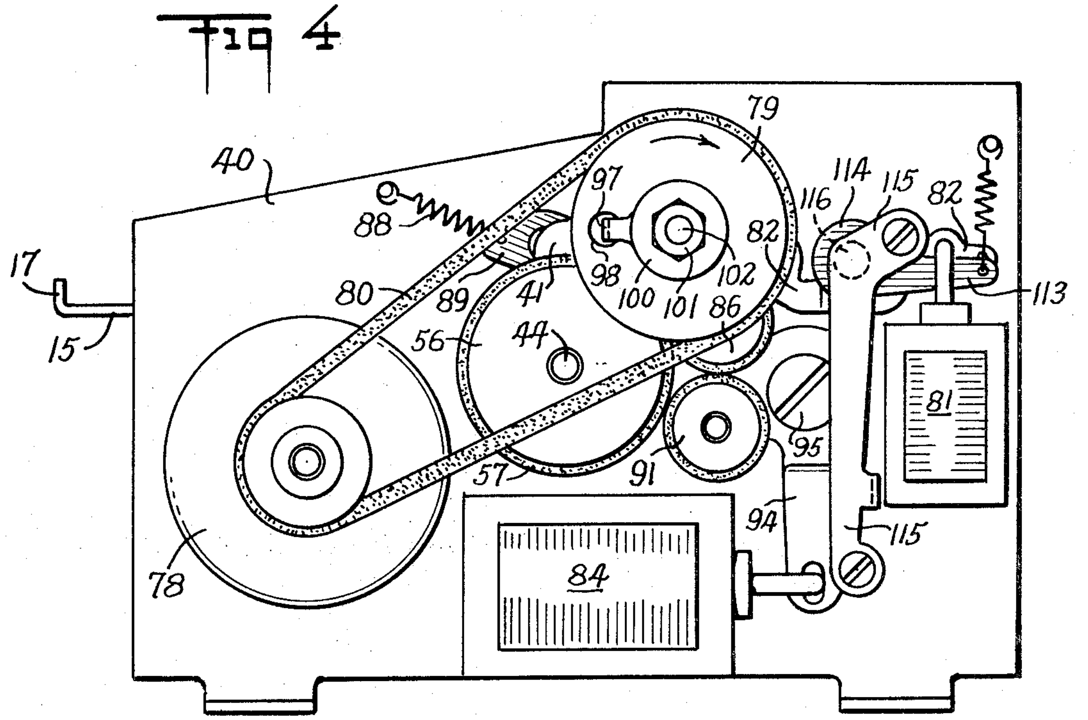
FIG. 4 is a right end view of the apparatus taken along the line 4—4 of FIG. 2.

Referring now to FIG. 4 of the drawings, which is a right end view of the machine taken along the line 4—4 of FIG. 2, a motor 78 drives a pulley 79 via a drive belt 80. The motor 78, which is reversible, normally drives pulley 79 in a clockwise direction as shown by the arrow in FIG. 4. A solenoid 81 operates an escapement lever 82 (FIGS. 5 and 6) to allow incremental advancement of the transducer head 68, while a second solenoid 84 operates a reversing mechanism as will be described more fully hereinafter with reference to FIGS. 5 and 10 of the drawings.

Figure 5:
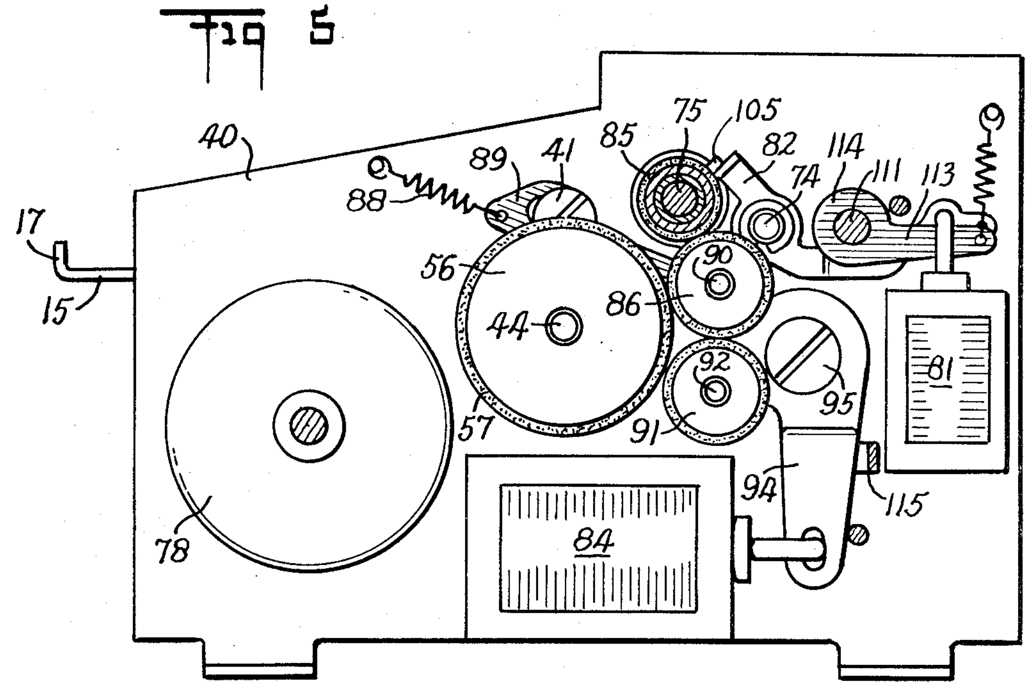
FIG. 5 is a cross-sectional right end view taken along the line 5—5 of FIG. 2.

Reference is now had to FIG. 5 of the drawings which is a right end view of the machine taken along the line 5—5 of FIG. 2. A smaller diameter driving hub 85 on the inner end of driver pulley 79 (see also FIG. 2) engages the rim of an idler wheel 86 which in the normal quiescent state bears against the rim 57 of drive wheel 56 which is keyed to drive shaft 44 (see also FIG. 7). Idler wheel 86 is normally biased into frictional driving engagement with driving hub 85 and drive wheel 56 by spring 88 connected to a movable arm 89 which carries and supports idler wheel 86 on shaft 90. The manner and direction in which arm 89 is free to move is more clearly delineated in the enlarged view of FIG. 10. A reversing drive wheel idler 91 is rotatable about axis 92 mounted on and carried by a rocker arm 94 which pivots about axis 95 supported upon right end wall 40. Idler wheel 91 is constantly in driving engagement with idler 90 and normally disengaged from drive wheel 56 when the machine is in its quiescent state.

During all the operations of component parts as described thus far the machine has operated to receive a record card, transport the record card to its quiescent position against the card positioning rear guide wall, and to hold the card in this position through the torque on card drive wheels 27 and 28 (FIG. 7) due to the constant rotation of shaft 44 through the unidirectional slip clutches. However, upon receiving a signal from associated electronics (not shown) that enough information has been stored in the input registers (input buffer store) and indicating readiness thereof for transfer to the record card, the reversing solenoid 84 is energized thereby causing rocker arm 94 to move idler wheel 91 upwardly against idler 86, crowding idler 86 away from engagement with wheel 56 and bringing idler wheel 91 into driving engagement with the periphery of drive wheel 56, whereby reverse (counter-clockwise) rotation is imparted to drive shaft 44. The unidirectional clutches (47–51 and 54–53 in FIG. 7) have no slip in counter-clockwise rotation and so card drive wheels 27 and 28 (FIG. 7) rapidly move the card away from the rear guide wall. Because of the positive drive of the clutches in this direction the card is rapidly accelerated from its quiescent position and quickly brought to a constant linear velocity. Only a very small fraction of the available card travel is consumed in overcoming inertia to bring the light weight card to this constant velocity. Any slippage between the rubber covered roller wheels occurs only between the surfaces of wheels 85–86, and 56–91, thereby giving traction preference to the card driving surfaces 31 and 32 of card drive wheels 27 and 28 (FIG. 7). In this way both edges of the card are accelerated at the same rate and the card is caused to travel forward in a straight line. After a small increment of time has elapsed, sufficient to accelerate the card to constant linear velocity, the input electronics transfers the stored information through the magnetic head 68 (FIG. 2) to record the data on the surface of the card.

In this manner a recording pass is commenced and, in the preferred embodiment this also includes recording a timing or "clock" track or a complementary data track to provide self clocking in addition and parallel to the information tracks. When the information is in digital form the timing track consists of pulses laid down synchronously with the information data pulses, thereby providing a reference for playback. The rate of information transfer is constant and all of the information allotted for one recording pass is transferred to the card before the card reaches the end of available travel. A sufficient travel overlap is provided at the end of each card recording pass to allow tolerance for any slight variations of card speed, and also to allow for deceleration and reversal of card motion before the card exits from between the card engaging roller surfaces 29–31 and 30–32 (FIG. 7). The reversal of card travel at the end of each recording pass is accomplished merely by releasing solenoid 84, which is done automatically by electronic control circuitry (not shown). As the card is now returned to its quiescent position against the back wall 29, the card guide and straightening mechanisms, as described hereinabove with reference to FIG. 2 and FIG. 7, function in the same manner on each return to the quiescent state.

During each return pass of the card to its quiescent position the magnetic head 68 (FIG. 2) is advanced one incremental step, from left to right as viewed in FIG. 2, so that on each succeeding recording pass the head 68 will cover a fresh track parallel to all previously recorded tracks on the card. The mechanism by which this incremental longitudinal translation of the head 68 is achieved will now be described with particular reference to FIGS. 10, 11 and 12 of the drawings.

Figures 10, 11, 12:
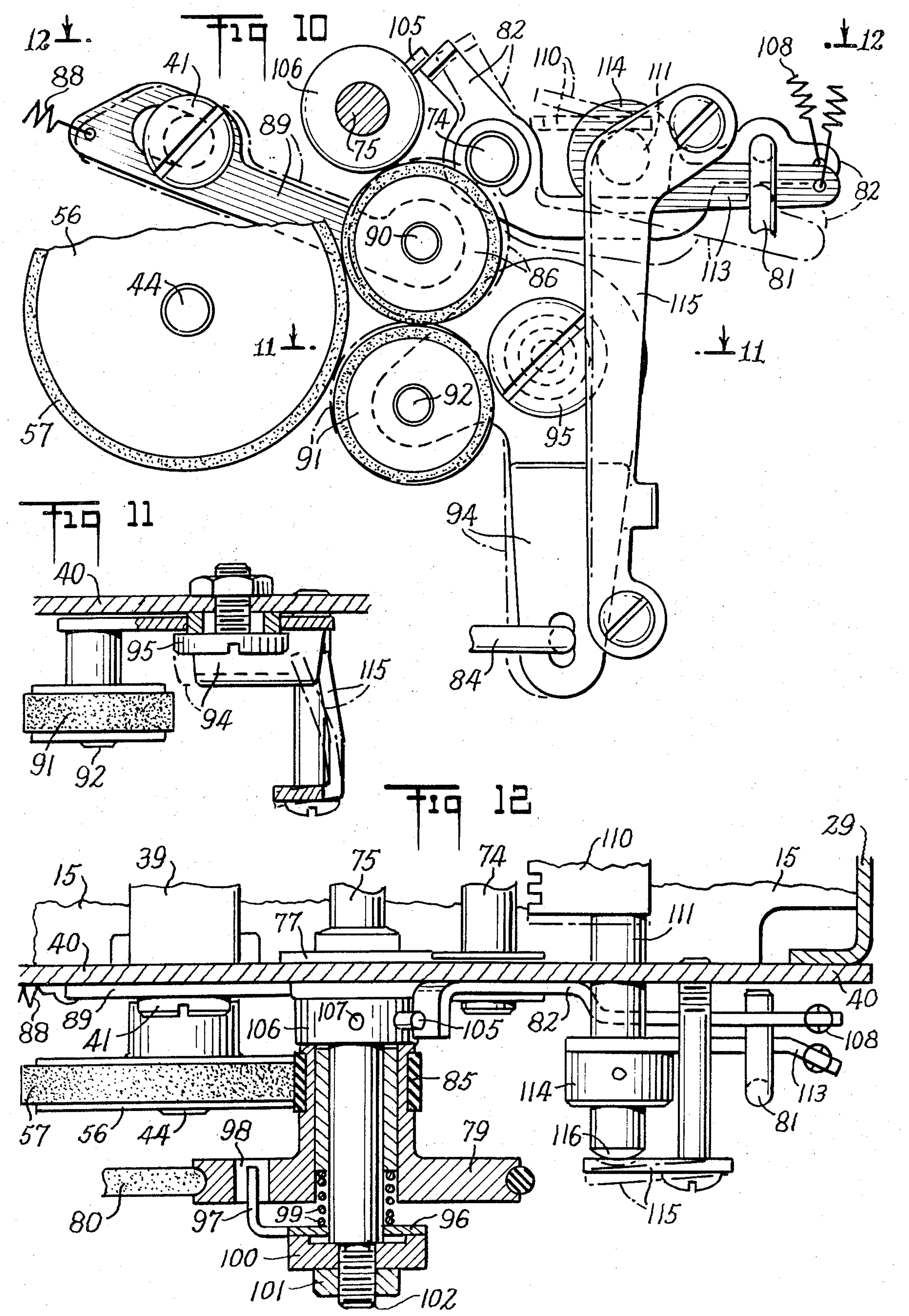
FIG. 10 is an enlarged detail view of the card drive and reversing mechanism of the invention, similar to the end view of FIG. 5 but showing the reversing position in broken lines.
FIG. 11 is an enlarged horizontal detail cross-section taken along the line 11—11 of FIG. 10 and showing an operative position in broken lines.
FIG. 12 is an enlarged detail top view, partially in section, taken along the line 12—12 of FIG. 10.

Referring first to FIG. 12, a clutch wear plate 96 is keyed to pulley wheel 79 by a bent lever arm portion 97 engaged within a hole 98 in the planar surface of pulley wheel 79. A compression spring 99 seated within a coaxial recess in the hub of wheel 79 forces wear plate 96 into frictional clutch engagement with a thrust washer 100 which is secured to the end of helical screw shaft 75 by means of a lock nut 101 mounted on threaded end 102 of shaft 75. As the pulley wheel 79 rotates constantly, torque is applied to screw shaft 75 through the frictional drag between the clutch surfaces of wear plate 96 and thrust washer 100. The spring 99 is light enough so that the resultant clutch friction does not apply any significant torsional impedance to the motor 78, but is strong enough to provide sufficient torque to screw shaft 75 so that, when allowed, the screw shaft will spin quickly and efficiently. However, except when it is desired to translate the magnetic head 68 (FIG. 2), the shaft 75 is restrained from rotation by an escapement lever 82 engaged with a pin 105 extending from collar 106. Escapement lever 82 is pivotally mounted on the end of shaft 74 extending through right sidewall 40. Collar 106 is keyed to screw shaft 75 by a pin 107. To allow lead screw shaft 75 to rotate the escapement lever 82 must swing upwardly to clear the pin 105. Lever 82 is actuated for this purpose by brief energization of solenoid 81 (FIG. 5) as shown in broken lines in FIG. 10, at the end of each recording pass. After such brief actuation of solenoid 81 lever 82 is returned by spring 108 in time to catch pin 105 at the end of only one revolution of shaft 75. However, at the option of the operator solenoid 81 may be retained energized by operation of switch 21 or switch 22 (FIG. 1) to provide either rapid advance or rapid reverse translation of magnetic head 68.

Figure 6:
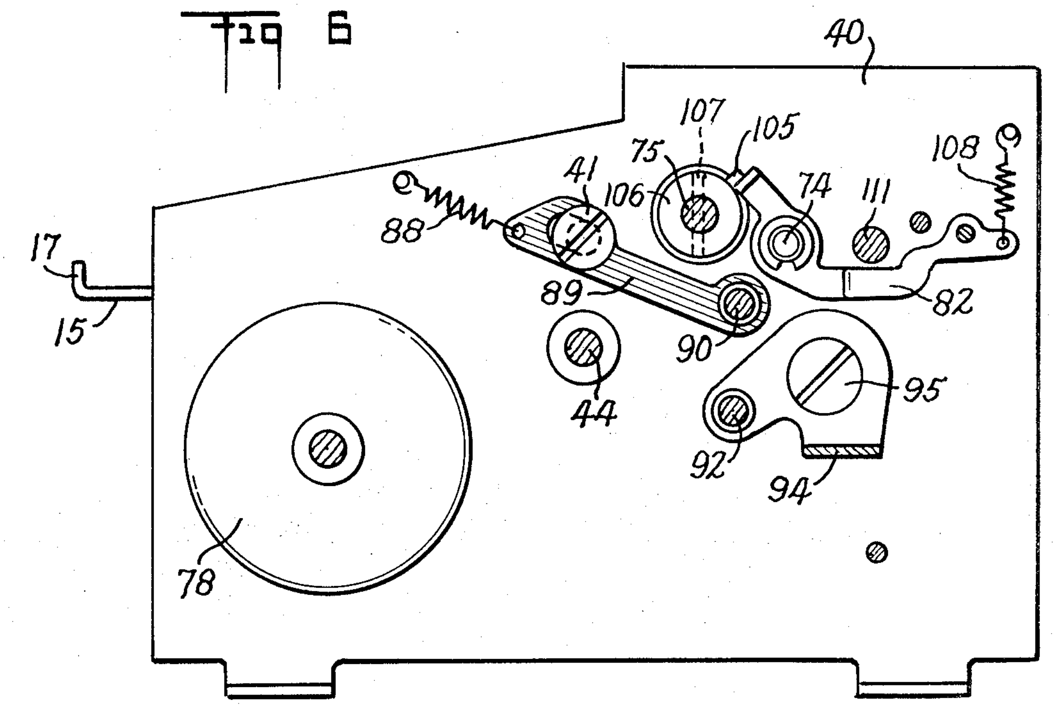
FIG. 6 is a cross-sectional right end view taken along the line 6—6 of FIG. 2.

To reverse the direction of transducer head translation the lead screw shaft 75 must be turned in the opposite direction, i.e., counter-clockwise as viewed in FIGS. 5 and 6. This is accomplished by reversing drive motor 78 simultaneously with energization of reversing solenoid 84 to keep the proper sense of direction on card drive rollers 27 and 28 (FIG. 7).

The transducer head bracket arm 69 (FIG. 2) carries pointer 20 (FIG. 1) which travels along the scale shown in window 19 (FIG. 1) to indicate to the operator at all times the exact position of transducer head 68. When the record card is ejected from the machine, either by manual operation of switch 23 or by an automatic intercept switch (not shown) upon the occasion of transducer head 68 reaching its extreme righthand operating position, an automatic head reset cycle is initiated by reversing the drive motor 78 to drive transducer head 68 along helical screw shaft 75 to the left end thereof in starting position preparatory to insertion of the next record card.

To assure complete interchangeability of record cards and machines, a considerable degree of precision is required in the location of the magnetic transducer head 68 over any given record track. This is achieved through the precision lead screw 75 in combination with a unique anti-backlash mechanism which completely eliminates problems of backlash by preloading the magnetic head bracket 69 toward the right edge of a record card prior to every recording or playback pass.

Referring once again to FIG. 2 of the drawings, the backlash eliminating mechanism of the invention comprises a square-toothed metallic comb 110 mounted on a horizontal shaft 111 which is journaled at opposite ends in sidewalls 36 and 40, and which extends within the machine parallel to precision lead screw shaft 75. The comb 110 when in its normal horizontal position as shown in FIG. 2 engages the protruding right bearing guide arm 72 of bracket 69 between two adjacent teeth of comb 110. Every time the transducer head 68 is advanced one or more steps, as described hereinabove, the comb 110 is raised via clockwise motion of lever arm 113 (as viewed in FIG. 4) which is affixed to shaft 111 by a collar 114. After each advance of transducer head 68 the comb 110 is again dropped down into its normal horizontal position, as shown by broken lines in FIG. 10, and protruding arm 72 of head bracket 69 is engaged between a different pair of teeth on comb 110. Upon actuation of the reversing solenoid 84 (FIG. 4) another lever arm 115 (FIGS. 2, 4 and 10) twists in such a manner as to release its thrust on protruding end 116 of shaft 111 whereupon a compression spring 112 surrounding the left end of shaft 111 pushes the shaft 111 and comb 110 from left to right as viewed in FIG. 2 so that one tooth (the left tooth engaging bracket arm 72) applies force against the head bracket 69. The manner in which shaft restraining lever 115 twists upon actuation of reversing lever arm 94 (FIG. 5) is shown by broken lines in the detail views of FIGS. 11 and 12. In this manner the transducer head bracket arm 72 is always maintained in intimate engagement with the left comb tooth of the pair of comb teeth between which it is engaged at any time. As the reversing solenoid 84 is actuated every time information is transferred through the transducer head 68, the anti-backlash mechanism is in force at all necessary times.

Figure 9:
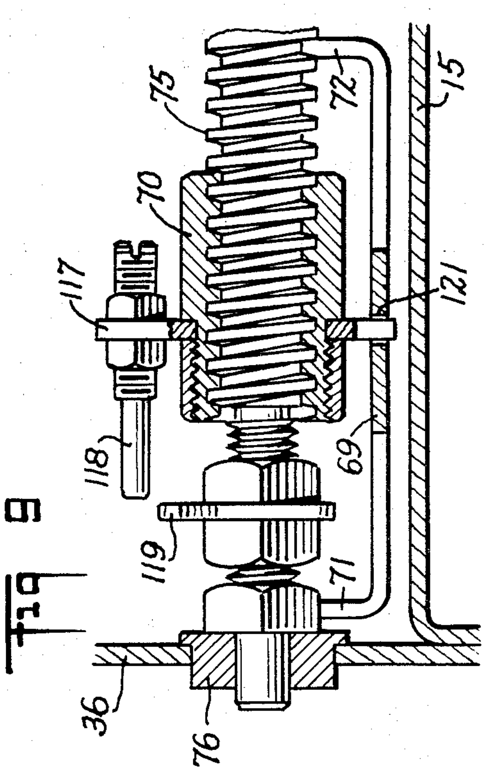
FIG. 9 is another detail sectional view taken along the line 9—9 of FIG. 8.
Figure 8:
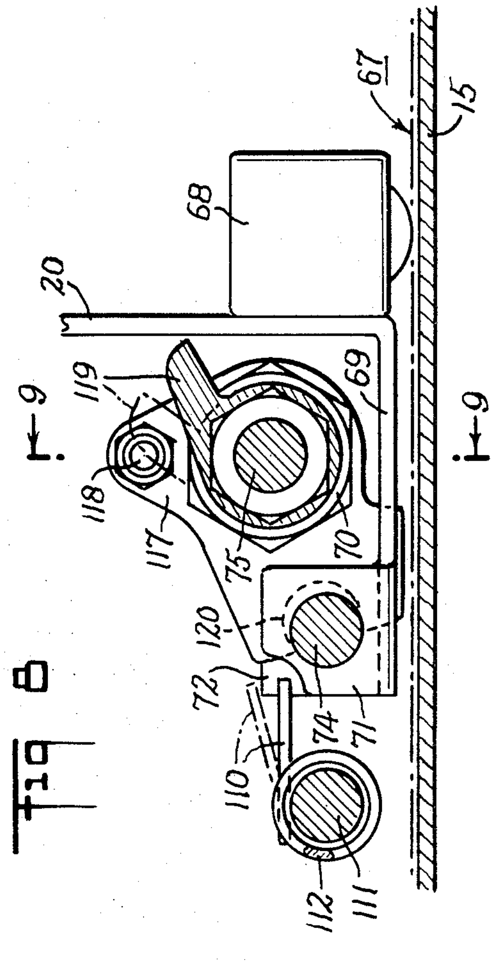
FIG. 8 is a detail cross-sectional view taken along the line 8—8 of FIG. 2.

Referring now to the enlarged detail drawings of FIG. 8 and FIG. 9, the manner in which transducer head 68 is mounted on bracket 69 and suspended from lead screw 75 may be more clearly seen. An enlarged opening 120 in vertical clamping plate 117 freely engages guide shaft 74 and holds screw follower (nut assembly) 70 from rotating. Limited vertical motion of transducer head 68, pivoting about shaft 74, to accommodate any slight surface irregularities which may be encountered on the surface of a record card while yet maintaining its longitudinally indexed position is allowed because the transducer mounting bracket 69 may move vertically (via a slot 121) with respect to the clamping plate 117. In practice the force of gravity has been found adequate to hold the transducer head 68 in proper intimate recording and playback engagement with the card record surface. However, if it should be desired to operate the machine in any position other than horizontal it would be within the scope of a reasonably skilled mechanic to provide spring loading to maintain the necessary pressure of transducer head against recording surface. As shown in FIGS. 8 and 9 the vertical clamping plate 117 may be provided with a horizontally extending pin 118 engageable with a rotating dog 119 secured to shaft 75 to prevent running the screw follower nut 70 and the transducer bracket 69 into binding engagement with the left end wall 36.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A recorder-reproducer apparatus for use with substantially planar record cards comprising in combination, A. a card receiving entrance slot opening through one wall of said apparatus, 1. guide means aligned with opposite ends of said entrance slot for centering a card inserted therein,
2. a precisely positioned back stop within said apparatus and opposite said entrance slot for accurately determining the location of a card inserted therein, B. card drive means within said apparatus for engaging the planar surfaces of a card inserted therein and for moving said card in a first direction into positive engagement with said back stop,
1. means for reversing said card drive means upon receipt of a start signal and for moving said card in a second direction away from said back stop for a predetermined distance less than the width of said card,
2. further means for restoring said card drive means to its first direction upon completion of movement of a record card through said predetermined distance, and for returning said card to engagement with said back stop, C. a transducer within said apparatus positioned to engage the planar surface of a record card at a point located at said predetermined distance from said back stop,
1. means for activating said transducer for recording in a first mode and for reproducing in a second mode while said record card is moved from said back stop through said predetermined distance,
2. further means for incrementally moving said transducer through sequential incremental steps in a direction normal to the direction of card movement while said drive means is moving a record card in said first direction through said predetermined distance toward engagement with said back stop, D. a notched guide bar under spring tension and engageable with the transducer at each incremental position to which the transducer may be advanced, to prevent backlash in the transducer translation and assure positive positioning of the transducer over each recording track, and E. means for reversing said card drive means to eject a record card from said entrance slot upon command.

2. In a line-by-line record scanning apparatus means for maintaining accurate positioning of an incrementally movable scanning transducer comprising in combination, A. a precision lead screw engaging a transducer having a protruding arm, B. a notched comb member supported in a plane parallel to said lead screw and engaging said protruding arm in a first notch thereof in a first position,
1. spring loading means connected with said comb member and applying a unidirectional force biasing said comb and said engaging transducer arm in a direction parallel to the axis of said lead screw,
2. means for moving said comb member into a second position out of engagement with said protruding arm, C. means for imparting limited rotational motion to said lead screw while said comb member is disengaged from said arm, whereby said transducer is moved in linear translation by said lead screw, and
1. means for restoring said comb member to said first position and engaging said protruding arm in a different notch thereof, whereby backlash between said lead screw and said transducer engaged therewith is eliminated by said spring loading means.

3. The combination of claim 2 wherein said means for imparting limited rotational motion to said lead screw comprises an escapement lever normally engaged with a radial protrusion extending from said lead screw normal to the axis thereof, and said escapement lever is momentarily moved from engagement with said protrusion to permit only one revolution of said lead screw, whereby upon each momentary actuation of said escapement lever said transducer is translated a distance equal to the pitch of said lead screw.

4. In a line-by-line record scanning apparatus including means for reversibly moving a substantially planar recording medium with respect to a transducer, means for incrementally translating said transducer in a direction normal to the line of said record medium motion comprising in combination, A. a precision lead screw formed on a rotatable shaft extending in a direction at right angles to the direction of record medium motion and in a plane parallel to the plane of said record medium, B. means including a frictional clutch for imparting rotational torque to said lead screw shaft, C. a first frictional drive wheel on said screw shaft and coupled thereto through said clutch,
1. a first idler wheel mounted on a movable arm and spring loaded in constant driving engagement with said first frictional drive wheel,
2. a second idler wheel mounted on a second movable arm and in constant driving engagement with said first idler wheel, D. a second frictional drive wheel normally in engagement with said first idler wheel and adapted to impart driving torque to said record moving means in a first direction, and E. means including a first solenoid connected to said second idler wheel mounting arm for moving said second idler wheel into driving engagement with said second frictional drive wheel while crowding said first idler wheel away from engagement with said second frictional drive wheel whereby reverse rotation is imparted to said first and second drive wheels.

5. The combination of claim 4 including a dog lever mounted on said rotatable screw shaft and an escapement lever engageable with said dog to prevent rotation of said screw shaft, said escapement lever connected with and operable by a second solenoid to move away from engagement with said dog whereby said screw shaft is allowed to turn in response to the rotational torque imparted through said clutch.

* * * * *